(12) United States Patent
Miller

(10) Patent No.: US 7,109,970 B1
(45) Date of Patent: Sep. 19, 2006

(54) APPARATUS FOR REMOTELY CONTROLLING COMPUTERS AND OTHER ELECTRONIC APPLIANCES/DEVICES USING A COMBINATION OF VOICE COMMANDS AND FINGER MOVEMENTS

(76) Inventor: Stephen S. Miller, 8 Gramercy Park South - Apt. 6K, New York, NY (US) 10003

( * ) Notice: Subject to any disclaimer, the term of this patent is extended or adjusted under 35 U.S.C. 154(b) by 579 days.

(21) Appl. No.: 09/609,961

(22) Filed: Jul. 1, 2000

(51) Int. Cl.
*G09G 5/00* (2006.01)
*G05B 11/01* (2006.01)
*G05B 15/00* (2006.01)

(52) U.S. Cl. .......................... 345/156; 700/17; 700/83
(58) Field of Classification Search ................. 700/83, 700/17; 345/156–158, 167–168, 179; 455/575.1, 455/575.6
See application file for complete search history.

(56) References Cited

U.S. PATENT DOCUMENTS

| | | | | |
|---|---|---|---|---|
| 4,414,537 A | * | 11/1983 | Grimes | 341/20 |
| 4,613,139 A | * | 9/1986 | Robinson, II | 463/37 |
| 5,377,303 A | | 12/1994 | Firman | |
| 5,442,729 A | * | 8/1995 | Kramer et al. | 704/271 |
| 5,444,462 A | * | 8/1995 | Wambach | 345/158 |
| 5,488,362 A | * | 1/1996 | Ullman et al. | 341/20 |
| 5,555,533 A | | 9/1996 | Peck | |
| 5,581,484 A | * | 12/1996 | Prince | 702/150 |
| 5,655,910 A | * | 8/1997 | Troudet | 434/233 |
| 5,835,077 A | * | 11/1998 | Dao et al. | 345/157 |
| 5,960,447 A | | 9/1999 | Holt et al. | |
| 5,987,310 A | * | 11/1999 | Gray | 455/575.6 |
| 6,012,995 A | | 1/2000 | Martin | |
| 6,089,872 A | * | 7/2000 | Mayhue et al. | 434/233 |
| 6,097,369 A | * | 8/2000 | Wambach | 345/158 |
| 6,098,886 A | * | 8/2000 | Swift et al. | 235/472.01 |
| 6,128,004 A | * | 10/2000 | McDowall et al. | 345/158 |
| 6,141,643 A | * | 10/2000 | Harmon | 704/271 |
| 6,151,208 A | * | 11/2000 | Bartlett | 361/683 |
| 6,154,199 A | * | 11/2000 | Butler | 345/167 |
| 6,266,635 B1 | | 7/2001 | Sneh | |

(Continued)

OTHER PUBLICATIONS

Sturman et al., A survey of glove-based input, 1994, IEEE Computer Graphics And Applications, pp. 30-39.*

*Primary Examiner*—Anthony Knight
*Assistant Examiner*—Ronald D. Hartman, Jr.
(74) *Attorney, Agent, or Firm*—Shemwell Mahamedi LLP

(57) ABSTRACT

An apparatus for remotely operating a computer using a combination of voice commands and finger movements. The apparatus includes a microphone and a plurality of control elements in the form of touch-sensitive touchpads and/or motion-sensitive elements that are used to operate the computer and to move an on-screen cursor. At least one touchpad is used to selectively switch between a command-mode of operation in which the computer interprets spoken words as commands for operating the computer and any software applications being used, and a text-mode of operation in which the computer interprets spoken words literally as text to be inserted into a software application. The apparatus is ergonomically designed to enable it to be easily worn and to enable a user to operate a computer from a standing, sitting or reclining position. The apparatus can be used to operate a computer for traditional computing purposes such as word processing or browsing the Internet, or for other purposes such as operating electronic devices such as a television and/or other household appliances. The apparatus eliminates the need for a keyboard and a mouse to operate a computer. In addition, the apparatus can be used as a telephone.

39 Claims, 3 Drawing Sheets

U.S. PATENT DOCUMENTS

| | | |
|---|---|---|
| 6,288,709 B1 | 9/2001 | Willner et al. |
| 6,452,584 B1 * | 9/2002 | Walker et al. .............. 345/158 |
| 6,470,197 B1 | 10/2002 | Tuoriniemi et al. |
| 6,581,033 B1 | 6/2003 | Reynar et al. |
| 2003/0028382 A1 | 2/2003 | Chambers et al. |
| 2005/0009584 A1 * | 1/2005 | Park ........................ 455/575.6 |
| 2005/0233707 A1 * | 10/2005 | Chen ......................... 455/90.1 |

* cited by examiner

APPARATUS FOR REMOTELY CONTROLLING COMPUTERS AND OTHER ELECTRONIC APPLIANCES/DEVICES USING A COMBINATION OF VOICE COMMANDS AND FINGER MOVEMENTS

FIELD OF THE INVENTION

The present invention pertains to apparatus for controlling computers and other electronic appliances/devices, and more particularly to an apparatus that uses voice controls and finger movement to remotely control various devices.

BACKGROUND OF THE INVENTION

Computers are widely used throughout the world by businesses, schools, governments, and in homes. Conventional desktop computers are operated using a keyboard and mouse, wherein the keyboard is typically used to enter text and commands, and the mouse is typically used for cursor navigation on and graphic control of the computer screen. Although conventional keyboards and mouse are typically coupled to a computer via cables, wireless keyboards and wireless mouse which operate over infrared or radio frequencies are also used to operate computers. In addition, for laptop computers, alternative mechanisms for cursor navigation and graphic control of a screen such as touchpads, track balls, and pointer sticks have been designed.

Conventional keyboards and mouse of the type just described all suffer from several drawbacks. Specifically, they must be used together in order to operate a computer. In addition, most keyboards and mouse must be used on a flat horizontal surface. Moreover, due to the small size and low resolution of the screens of both desktop and laptop computers, the user must be positioned in close proximity to the screen in order to view the information displayed thereon.

Several recent advances in technology are changing the way conventional computers are used. First, the advent of voice recognition systems which enable a user to give commands to a computer to insert text into a software application by speaking into a microphone is eliminating the need for keyboards. Second, new ways of viewing computers are being developed which no longer require the user to be positioned close to a stationary screen. These include large, high-resolution, flat-panel displays which can be wall-mounted, and goggle and monocle visors which are worn on the head. Nevertheless, both of these advances suffer from drawbacks. Specifically, computers using both voice recognition systems and high-definition large-screen, flat panel displays still require the use of a mouse for accurate cursor navigation and for graphic control of the screen. In addition, a user must be positioned in a stationary upright position in order to use the computer, without being able to recline or otherwise move about a room. Another drawback is that conventional computers and voice recognition systems fail to provide a means for enabling a computer to distinguish between spoken commands that operate the computer or a software application, and spoken text that is to be inserted literally into a software application. It is therefore an object of the present invention to provide an apparatus for remotely controlling computers and other electronic appliances/devices using a combination of voice commands and finger movements, which apparatus does not require the use of either a keyboard or a mouse.

SUMMARY

An apparatus for remotely operating a computer using a combination of voice commands and finger movements. The apparatus includes a plurality of control elements in the form of touch-sensitive touchpads and/or motion-sensitive elements that are used to operate the computer and to move an on-screen cursor. At least one touchpad is used to selectively switch between a command-mode of operation in which a user can issue spoken commands for selecting applications and for instructing the computer, and a text-mode of operation in which the user speaks the text to be inserted into an application. The apparatus is ergonomically designed to enable it to be easily worn and to enable a user to operate a computer from a standing, sitting or reclining position. The apparatus can be used to operate a computer for traditional computing purposes such as word processing or browsing the Internet, or for other purposes such as operating electronic devices such as a television and/or other household appliances.

DETAILED DESCRIPTION OF THE INVENTION

Figure 1A:
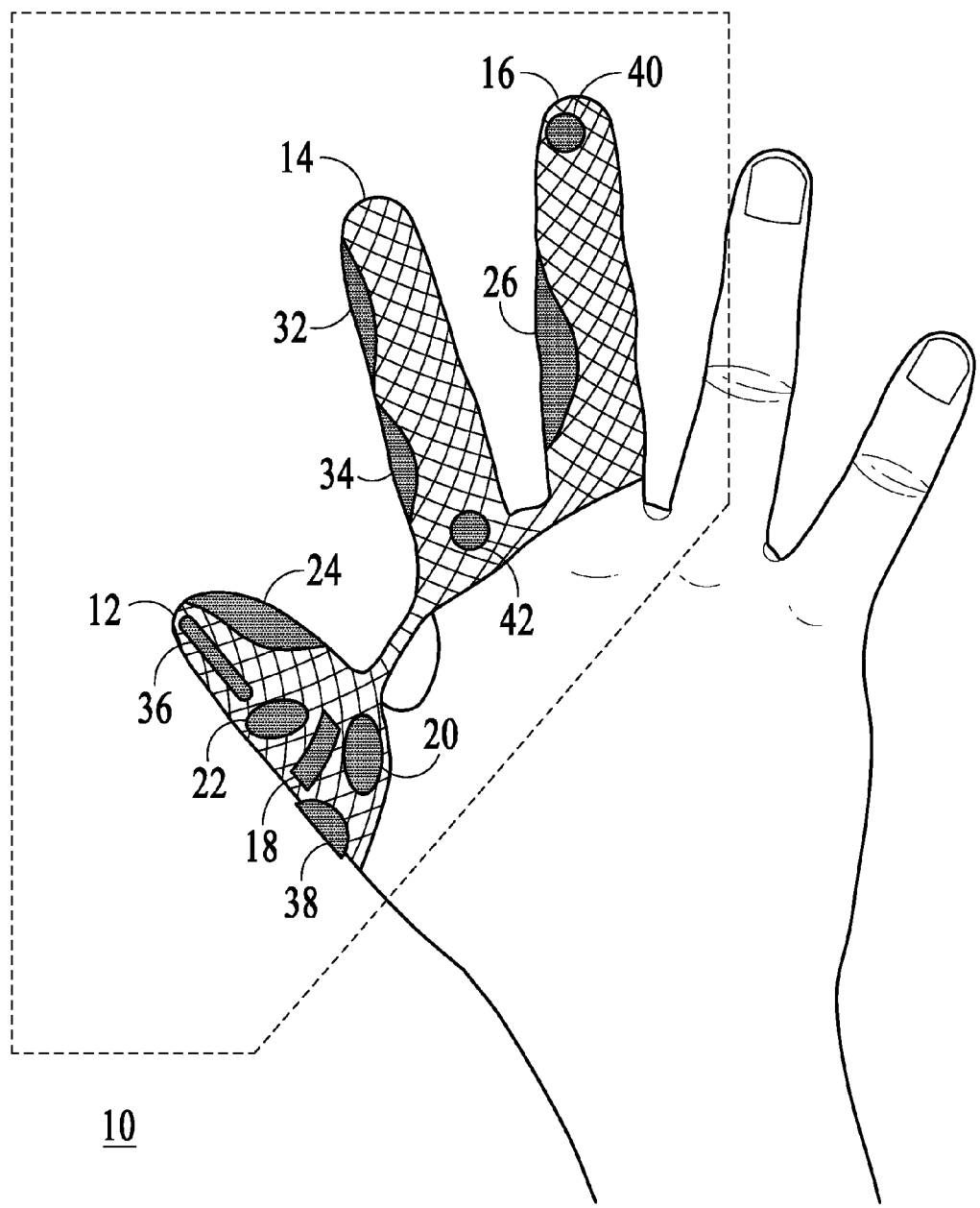
FIG. 1A shows a top view of an exemplary embodiment of an apparatus for remotely controlling computers and other electronic appliances/devices according to the present invention.
Figure 1B:
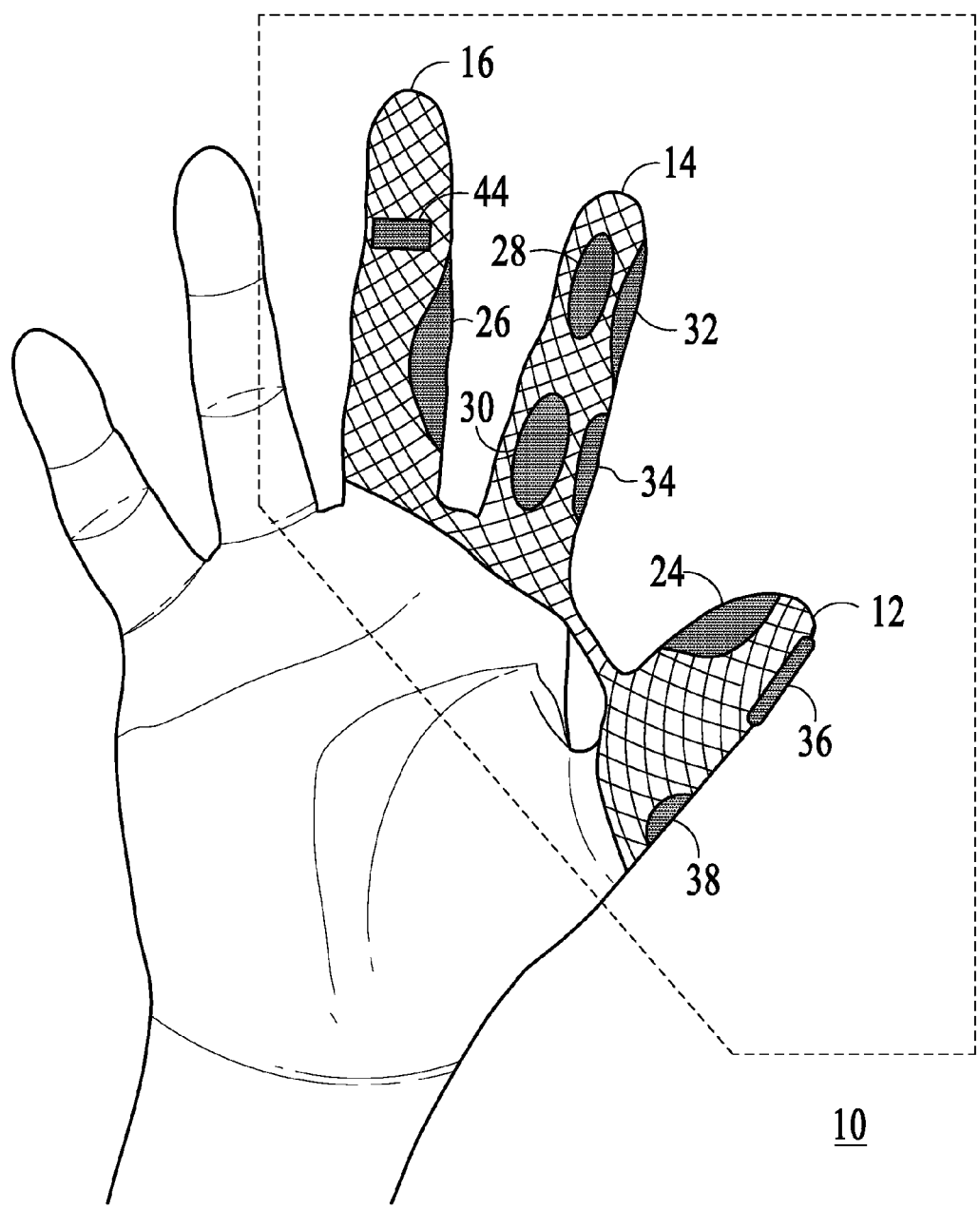
FIG. 1B shows a bottom view of the apparatus shown in FIG. 1A.
Figure 2:
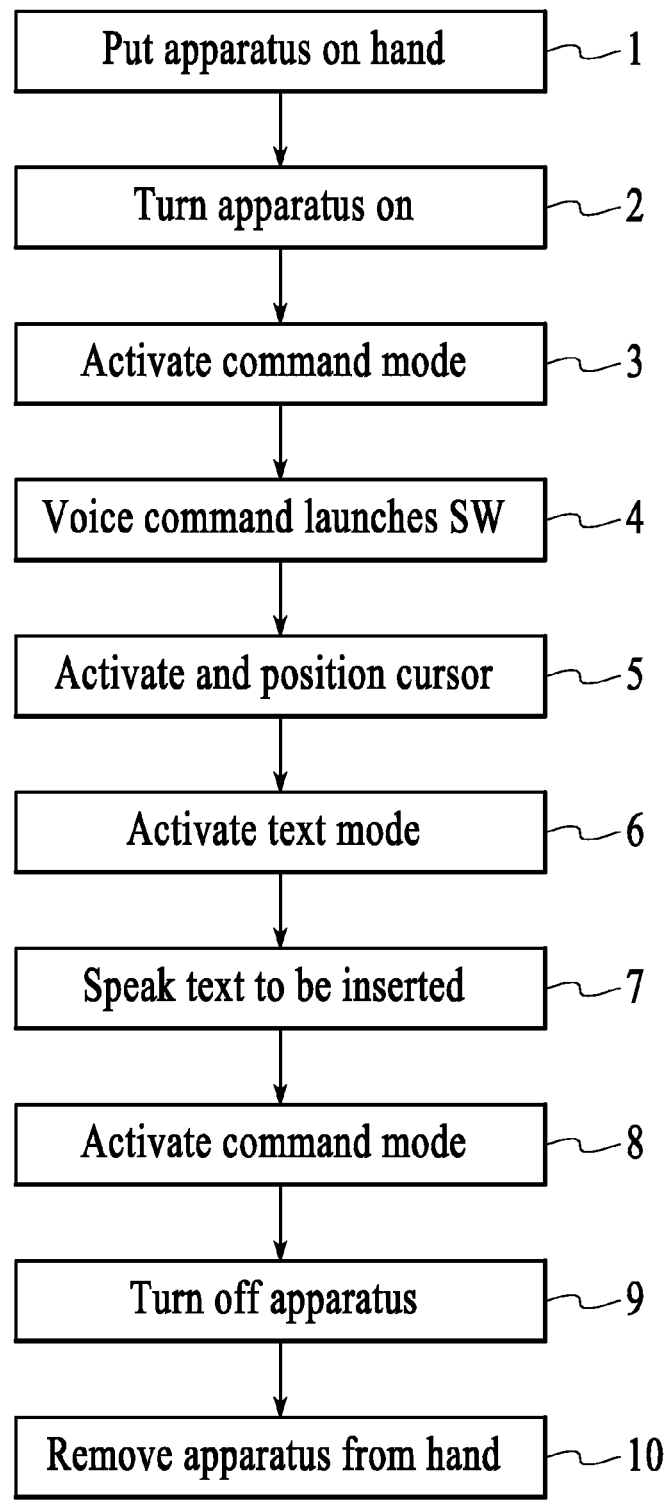
FIG. 2 shows a flowchart depicting the steps in using the present invention.

FIG. 1 shows a top view of an exemplary embodiment of an apparatus 10 for remotely operating computers and other electronic appliances/devices using a combination of voice commands and finger movements according to the present invention. FIG. 2 shows a bottom view of apparatus 10.

Apparatus 10 can be used together with voice recognition systems and large-screen, flat-panel displays that are included as part a computer network to: 1) operate the computer as is traditionally done, e.g., to browse the Internet or edit a word processing document; 2) use the computer to operate a television; and/or 3) use the computer to operate other electronic appliances/devices. The use of voice recognition systems and large-screen, flat-panel displays enables a user to operate the computer from any position and without having to be in close proximity to the display, e.g., walking around a room, reclining on a chair, etc. The network can include a plurality of large-screen, flat-panel displays, wherein different rooms of a home or office have a display so that a user can operate the computer from such rooms. Apparatus 10 can also be used in conjunction with the network to operate heating/air conditioning systems, security systems, etc.

Apparatus 10 is comprised of three finger-shaped sleeves 12, 14 and 16 which are coupled together and are designed to be worn like gloves around the thumb, index and middle fingers, respectively, of a person's hand. Sleeves 12, 14 and 16 can be fabricated from any type of material and can be constructed in any pattern such as the mesh pattern shown in FIGS. 1A and 1B. Apparatus 10 can be fabricated to have any number of sleeves which can be worn on any number of fingers. Alternative embodiments of apparatus 10 can be fabricated to be worn on one or two hands and/or on part of one or two arms.

Apparatus 10 includes an on/off switch 18, a transmitter 20 for transmitting signals to the computer being operated, and a receiver 22 for receiving signals from such computer. Apparatus 10 includes a control element in the form of a touch-sensitive thumb touchpad 24, which when held against one of the plurality of other touch-sensitive touchpads 26, 28, 30, 32, or 34 operates a computer as described below. The functions of a conventional mouse are performed by using touchpads 24, 26, and 36 shown in FIGS. 1A and 1B, and 28 and 30 shown in FIG. 1B to move a cursor on a computer screen used as the graphical interface for operating a computer. When thumb touchpad 24 is held against cursor activator touchpad 26, the cursor movement function on the screen is activated in the same manner that a cursor on a computer screen comes under the user's control when they place their hand on a conventional computer mouse.

A motion-sensitive pointer 36 is positioned on thumb sleeve 12 and extends from the top of the first knuckle of the thumb to the tip of the thumb. Moving motion-sensitive pointer 36 while maintaining contact between thumb touchpad 24 and cursor activator touchpad 26 causes corresponding movement of the cursor on the computer screen in the same manner that a cursor on a display screen is moved by moving a conventional computer mouse on a mouse pad.

When index finger touchpad 28 is tapped once against thumb touchpad 24, the object the cursor is pointing to on the computer screen at such time is activated in the same manner that an object is activated by clicking the left button of a conventional computer mouse. Tapping index finger touchpad 28 twice against thumb touchpad 24 is the equivalent of double-clicking the left button of the mouse. If index finger touchpad 28 is instead held in continuous contact with thumb touchpad 24, moving motion-sensitive pointer 36 drags the object selected on the screen to a different screen location in the same manner that an object on a computer screen is selected and dragged by holding down the left button of a mouse on the object, dragging the object to a different screen location and then releasing the left mouse button. If index finger touchpad 30 is tapped against thumb touchpad 24, the options for the object selected by the cursor will be displayed in the same manner that the options for an object are displayed on a computer screen by clicking the right button of a conventional mouse.

A microphone 38 is embedded or otherwise coupled to thumb sleeve 12 of apparatus 10. When thumb touchpad 24 is held against text-mode touchpad 32, the microphone is turned on and engaged in text-mode and any words or sounds spoken into microphone 38 by the user are inserted as text into the application displayed on the computer screen, such as inserting text into a word-processing document. When thumb touchpad 24 is held against command-mode touchpad 34, the microphone is turned on and engaged in command-mode and any words or sounds spoken into microphone 38 by the user are interpreted by the computer as instructions to perform a certain task, such as deleting highlighted text or turning an appliance on or off.

A speaker 40 is coupled to the end of middle finger sleeve 24 so that by placing the first joint of middle finger sleeve 16 near an ear and the tip of thumb sleeve 12 near their mouth, a user can use apparatus 10 as a telephone. A battery 42 is affixed near the back of index finger sleeve 14 to provide electronic power to different components of apparatus 10. A scroll touchpad 44 for scrolling up and down the pages on a computer screen is coupled to the back of middle finger sleeve 16. When thumb touchpad 24 is moved up and down against scroll touchpad 44, a user can scroll up and down, respectively, through the pages displayed on the computer screen in the same manner that the recently popularized scroll wheel of a conventional mouse enables a user to scroll up and down through the pages displayed on a computer screen.

FIG. 2 shows a flowchart depicting the steps in using apparatus 10 to operate a computer. At step 1, a person places apparatus 10 on the thumb, index and middle fingers of one hand. At step 2, the user turns apparatus 10 on using on/off switch 18. At step 3, the user touches thumb touchpad 24 to command-mode touchpad 34 to activate the command-mode operation of the computer. At step 4, the user issues a voice command to open a software application, e.g., Internet browser, word processing document, etc., to be used. At step 5, the user touches thumb touchpad 24 to cursor activator touchpad 26 to activate the cursor, and while touchpads 24 and 26 are in contact the user uses motion-sensitive pointer 36 to position the cursor on the computer screen where text is to be inserted. The user releases thumb touchpad 24 from cursor activator touchpad 26 when the cursor has been positioned where text is to be inserted. At step 6, the user touches thumb touchpad 24 to text-mode touchpad 32 to activate the text-mode operation of the computer. At step 7, the user speaks the text to be inserted into the application. At step 8, the user touches thumb touchpad 24 to activate the command-mode touchpad 34 to activate the command-mode operation of the computer and issues a voice command to close the application. At step 9, the user turns off on/off switch 18 to turn off apparatus 10. At step 10, the user removes apparatus 10 from their fingers. Alternatively, the user need not remove apparatus 10, but can wear the same as a clothing accessory.

The various elements of apparatus 10, such as touchpads 24, 26, 28, 30, 32 and 34, motion-sensitive pointer 36, microphone 38, speaker 40, battery 42 and scroll touchpad 44 can each be positioned on any one of sleeves 12, 14 or 16 such that the operable functions of apparatus 10 are implemented differently than in the manner described herein. For example, motion-sensitive pointer 36 can be implemented on index finger sleeve 14 rather than on thumb sleeve 12. In addition, apparatus 10 can be fabricated so that it automatically turns off if it is not used for a predetermined period of time. Also apparatus 10 can be fabricated to include a motion sensor enabling apparatus 10 to be turned on and off by the user snapping his or her fingers or in some other manner.

Apparatus 10 is implemented using conventional hardware and/or software which enables it to communicate with computers and other electronic appliances/devices. Apparatus 10 is designed to operate computers using existing software operating systems, such as Microsoft® Windows®, and existing software applications, such as Microsoft® Word® or a web browser. A user may wear an additional amplification device on the body to amplify signals transmitted from or received by apparatus 10. Apparatus 10 can communicate with computers over any frequencies that permit wireless, remote communications, including infrared and radio frequencies. Alternatively, apparatus 10 can be coupled to the computer using a cable. Apparatus 10 can be used to simultaneously operate multiple computers and/or appliances/devices. Apparatus 10 can be used to operate computers and appliances/devices as long as the appropriate drivers and communication protocols are installed on such computers and appliances/devices.

Apparatus 10 can be used with headgear such as goggles, monocles and glasses that are worn on the head to operate a computer. Apparatus 10 can also be used with a stylus and touch-sensitive touch screen to operate a computer. Apparatus 10 can also be used as a game controller, and can include additional touchpads for playing games. In addition, multiple persons each wearing a separate apparatus 10 can simultaneously play a game or jointly operate an application on the computer.

The aforementioned components comprising apparatus 10 can be fabricated from any material, can be coupled to any one of sleeves 12, 14, and 16, and can be secured to apparatus 10 using any means. Numerous modifications to and alternative embodiments of the present invention will be apparent to those skilled to the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. An apparatus for controlling an electric device, comprising:
   a plurality of finger-shaped sleeves that are coupled together and are each worn on a different finger of a hand, wherein at least one of the plurality of sleeves has at least one contact-sensitive element for controlling an electronic device using finger movements; and a microphone embedded in one of the plurality of sleeves, wherein the electronic device is operated using a combination of finger movements and voice commands.

2. The apparatus according to claim 1, wherein the plurality of sleeves form a glove and further comprising a microphone coupled to one of the plurality of sleeves, wherein the electronic device is operated using a combination of finger movements and voice commands.

3. The apparatus according to claim 1, wherein the at least one contact-sensitive element is a touch-sensitive touchpad.

4. The apparatus according to claim 1, wherein the at least one contact-sensitive element is a button.

5. The apparatus according to claim 1, wherein the apparatus operates the electronic device remotely.

6. The apparatus according to claim 5, wherein the apparatus operates at an infrared frequency.

7. The apparatus according to claim 5, wherein the apparatus operates at a radio frequency.

8. The apparatus according to claim 1, wherein the apparatus is coupled to the electronic device by a cable.

9. The apparatus according to claim 1, wherein the electronic device is a computer.

10. The apparatus according to claim 1, wherein the at least one contact-sensitive element is a motion-sensitive pointer for moving a cursor on a display device.

11. The apparatus according to claim 1, wherein the electronic device is used to operate a television.

12. The apparatus according to claim 1, wherein the electronic device is used to operate a household appliance.

13. The apparatus according to claim 1, wherein the electronic device is used to operate a computer.

14. The apparatus according to claim 1, wherein the apparatus includes communication means and a speaker enabling the apparatus to be used as a telephone.

15. The apparatus according to claim 1, wherein the apparatus includes a receiver for receiving electronic signals from the electronic device.

16. The apparatus according to claim 1, wherein the apparatus includes a transmitter for transmitting signals to the electronic device.

17. The apparatus according to claim 1, wherein the apparatus includes a cursor activator touchpad, whereby touching the cursor activator touchpad activates control of a cursor on a display device.

18. The apparatus according to claim 17, wherein the apparatus includes a motion-sensitive pointer used to move the cursor on the display device.

19. The apparatus according to claim 1, wherein the apparatus includes a scroll touchpad for scrolling up and down pages displayed on a display device.

20. The apparatus according to claim 1, wherein the apparatus can be used in conjunction with headgear to operate the electronic device.

21. The apparatus according to claim 1, wherein the apparatus can be used in conjunction with a stylus and a touch-sensitive touch screen to operate the electronic device.

22. An apparatus for controlling an electric device, the apparatus comprising:
   a plurality of finger-shaped sleeves that are coupled together and are each worn on a different finger of a hand, wherein at least one of the plurality of sleeves has at least one contact-sensitive element for controlling an electronic device using finger movements; and a microphone embedded in one of the plurality of sleeves, wherein the electronic device is operated using a combination of finger movements and voice commands; and
   wherein the contact-sensitive element includes one or both of a (i) text-mode touchpad for instructing a voice recognition system to interpret spoken words literally as text to be inserted into a software application displayed on a display device by speaking into the microphone; or (ii) a command-mode touchpad for instructing a voice recognition system to interpret spoken words as operating commands for the electronic device or a software application by speaking into the microphone.

23. The apparatus according to claim 22, wherein the at least one contact-sensitive element is a touch-sensitive touchpad or a button.

24. The apparatus according to claim 22, wherein the electronic device is configured to operate one or more of a television, a household appliance, or a computer.

25. A method for remotely controlling a computer, comprising the step of:
   using an apparatus having a plurality of finger-shaped sleeves that are coupled together and are each worn on different fingers of a hand, the apparatus having a microphone coupled to one of the plurality of sleeves, and the plurality of sleeves each having at least one contact-sensitive element for remotely operating an electronic device using a combination of finger movements and voice commands.

26. The method according to claim 25, wherein the apparatus transmits and receives signals at infrared frequencies.

27. The method according to claim 25, wherein the apparatus transmits and receives signals at radio frequencies.

28. An apparatus for operating a computer, comprising:
   at least one finger shaped sleeve to be worn on a finger of a hand for remotely operating a computer using a combination of voice commands and finger movements, the sleeve including a microphone into which a user speaks voice commands and at least one contact-sensitive element for selectively switching between a text-mode of operation and a command-mode of operation.

29. The apparatus according to claim 28, wherein the user operates the computer in the command-mode to issue spoken commands to the computer by speaking into the microphone.

30. The apparatus according to claim 28, wherein the user operates the computer in the text-mode to insert spoken text into an application displayed on a display device by speaking into the microphone.

31. The apparatus according to claim 28, wherein the user uses the at least one contact-sensitive element to activate control of a cursor on a display device.

32. The apparatus according to claim 31, wherein the user uses the at least one contact-sensitive element to move the activated cursor.

33. The apparatus according to claim 28, wherein the apparatus eliminates the need to use a keyboard to operate the computer.

34. The apparatus according to claim 28, wherein the apparatus enables a user to operate the computer from a reclining position.

35. The apparatus according to claim 28, wherein the apparatus enables a user to operate the computer from a seated position.

36. The apparatus according to claim 28, wherein the apparatus enables a user to operate the computer from a standing position.

37. The apparatus according to claim 28, wherein the apparatus can be used in conjunction with headgear to operate the computer.

38. The apparatus according to claim 28, wherein the apparatus can be used in conjunction with a stylus and a touch-sensitive touch screen to operate the computer.

39. The apparatus according to claim 28, wherein the apparatus is ergonomically designed to facilitate remote operation of the computer.

* * * * *